United States Patent
Rehn

(10) Patent No.: US 7,377,688 B2
(45) Date of Patent: May 27, 2008

(54) METHOD AND APPARATUS FOR DETERMINING THE BULB TEMPERATURE OF HIGH PRESSURE DISCHARGE LAMPS

(75) Inventor: Henning Rehn, Berlin (DE)

(73) Assignee: Patent-Treuhand-Gesellschaft für elektrische Gluhlampen mbH, Munich (DE)

( * ) Notice: Subject to any disclaimer, the term of this patent is extended or adjusted under 35 U.S.C. 154(b) by 0 days.

(21) Appl. No.: 11/298,655

(22) Filed: Dec. 12, 2005

(65) Prior Publication Data

US 2006/0145584 A1    Jul. 6, 2006

(30) Foreign Application Priority Data

Dec. 16, 2004   (DE) .................. 10 2004 060 592

(51) Int. Cl.
*G01J 5/00* (2006.01)
(52) U.S. Cl. ..................... 374/120; 374/141
(58) Field of Classification Search ........... 374/120, 374/141
See application file for complete search history.

(56) References Cited

U.S. PATENT DOCUMENTS

| | | | | |
|---|---|---|---|---|
| 4,247,202 A | * | 1/1981 | Failes | 356/310 |
| 4,720,190 A | * | 1/1988 | Peterson | 356/45 |
| 4,922,089 A | * | 5/1990 | McGuire et al. | 250/205 |
| 6,365,899 B1 | * | 4/2002 | Arai et al. | 250/338.1 |
| 7,001,068 B2 | * | 2/2006 | Howard | 374/161 |

FOREIGN PATENT DOCUMENTS

GB      1265417      3/1972

* cited by examiner

*Primary Examiner*—Gail Verbitsky
*Assistant Examiner*—Mirellys Jagan
(74) *Attorney, Agent, or Firm*—William E. Meyer

(57) ABSTRACT

An inventive method for determining the bulb temperature (T) of high pressure discharge lamps is disclosed that comprises the following steps: ascertaining a first spectral radiant power ($M_P$) at a first wavelength ($\lambda_P$); ascertaining a second spectral radiant power ($M_C$) at a second wavelength ($\lambda_C$) different from the first; determining the quotient ($\beta$) from the first and second radiant power; and determining the temperature (T) of the bulb on the basis of this quotient. It likewise discloses an apparatus for carrying out the inventive method.

8 Claims, No Drawings

METHOD AND APPARATUS FOR DETERMINING THE BULB TEMPERATURE OF HIGH PRESSURE DISCHARGE LAMPS

TECHNICAL FIELD

The present invention relates to a method for determining the bulb temperature of high pressure discharge lamps.

BACKGROUND ART

High pressure discharge lamps, for example high-pressure mercury discharge lamps, are currently used in diverse fields of application, for example in projectors.

It is important here to set the temperature of the lamp bulb to an optimum operating temperature with a relatively narrow tolerance band, preferably ±50 K. Since the lamp would quickly devitrify above this temperature range, while the effectiveness of the cycle process would no longer be obtained below the temperature range, the service life is reduced by an excessively high or excessively low temperature. Furthermore, an excessively high lamp temperature can impair units and electronic systems connected to the lamp.

It is known in principle for this purpose to determine the temperature of the bulb and to keep the operating temperature in the above named temperature range by setting a cooling regime.

A number of methods are known for determining the temperature of the bulb.

Firstly, thermocouples can be fastened on the surface of the bulb. However, the usual problems with the use of thermocouples exist in this case. For example, the elements cemented on can become detached from the bulb or supply false values in certain configurations. In addition, such thermocouples require additional outlay on mounting, and electric wiring.

A further possibility consists in determining the lamp voltage and using it with the aid of a known relationship between lamp voltage and temperature for the purpose of determining the latter. However, because the relationship varies according to operating states this method is very inaccurate.

In order to avoid above named disadvantages, it is therefore customary at present to use a pyrometer or infrared camera to measure the temperature of the bulb. However, these methods require a separate optical connection to the bulb, that is to say all the housings surrounding the bulb (for example reflector, lamp housing, projector housing) must have appropriate bores, but this is not always possible in design terms. Moreover, there is the risk of errors owing to vignetting.

DISCLOSURE OF THE INVENTION

The invention is based on the object of providing a method and an apparatus for determining the bulb temperature of high pressure discharge lamps which require no additional optical access to the bulb.

This object is achieved by a method comprises the following steps: ascertaining a first spectral radiant power at a first wavelength; ascertaining a second spectral radiant power at a second wavelength different from the first; determining the quotient from the first and second radiant power; and determining the temperature of the bulb on the basis of this quotient.

The method is based on the finding that at relatively high temperatures the pressure of the gas in the bulb also increases in accordance with the gas laws. At a relatively high pressure in the bulb, in turn, the spectral radiant power $M_P$ sinks in the region of the principal lines, that is to say the spectral lines of the gas(es) with which the lamp bulb is filled, while the spectral radiant power $M_C$ rises in the region of the background of the continuum. The quotient $\beta = M_P/M_C$ of these two radiant powers is therefore directly dependent on the temperature of the gas in the bulb, and therefore on the temperature of the bulb itself, which can therefore be determined from known quotients.

Such a method requires only the measurement of the spectral radiant power. This can also take place outside the lamp housing, for example in the scattered light (for example from the light mixing rod or a projector or the shank of the bulb), or even in the residual light penetrating through a reflector. There is thus no need for the separate optical connection to the bulb. The measurement advantageously takes place in the useful light of the lamp.

The method according to the invention is sufficiently accurate. It has proved in experiments that temperature can be determined with a tolerance of ±20 K, and so it is possible to comply with the customary tolerance bands in the control process.

The method according to the invention further requires no structural changes to the housings, reflectors or the like that surround the bulb. Likewise, there is no need for any additional and vulnerable components such as thermocouples.

The temperature determined according to the invention can advantageously be used in a temperature controller. The general approach for this purpose is to prescribe a desired bulb temperature ($T_{Soll}$), to determine the actual bulb temperature (T) by means of a method according to the present invention, and subsequently to drive at least one operational parameter of the high pressure discharge lamp such that the actual bulb temperature approaches the desired bulb temperature. The feedback, the control algorithm and the regulated variables can be handled in this case according to a prior art known in the cybernetics, for example PID control, fuzzy control or model-supported feedforward or feedback control. In particular, the electric power and/or cooling of the lamp can be controlled as a function of the temperature thus determined.

The first wavelength is preferably in the range of the principal lines, for example in the range from 539 nm to 559 nm or 568 nm to 588 nm in the case of high pressure mercury discharge lamps.

The second wavelength is advantageously in the range of the background, for example in the range from 470 nm to 530 nm, in particular from 470 nm to 490 nm, in the case of high pressure mercury discharge lamps.

Instead of a "sharp" spectral radiant power $M(\lambda)$ at a wavelength $\lambda$, it is advantageously possible to use mean spectral radiant powers that are given, for example, by $$\overline{M} = \int_{\lambda - \wedge \lambda}^{\lambda + \wedge \lambda} M(\lambda) d\lambda. \tag{1}$$

This allows even relatively simple spectrometers or dual-wavelength sensors to be used in order to ascertain the radiant power.

The result of extensive investigations by the applicant is that the quotient $\beta = M_P/M_C$ of the two spectral radiant powers obeys the following equation:

$$\beta(T) = \beta_0 \left[ 1 + \exp\left( \frac{T_C - R \cdot P - T}{T_0} \right) \right] \quad (2)$$

$\beta_0$, $T_C$, $R$ and $T_0$ designating lamp-specific constants, P the electric power, and T the temperature of the bulb.

If these constants are ascertained for a specific lamp, the temperature can be determined directly by measuring the spectral radiant power and the electric power.

However, the constant $\beta_0$, in particular, is a function of a multiplicity of factors, including the filling pressure of the individual lamp and the spectral properties of the measuring path that is determined, for example, by a reflector coating, projector optics or similar. In order to eliminate these dependences, a second quotient is measured at a second temperature in accordance with a preferred design of the present invention. Division of the two quotients thus obtained advantageously eliminates the constant $\beta_0$.

For this purpose, in a preferred design the method comprises the further steps of: ascertaining a third spectral radiant power at the first wavelength and the second temperature, differing from that at which the first spectral radiant power is ascertained; ascertaining a fourth spectral radiant power at the second wavelength and the second temperature; determining the quotient of the third and fourth radiant power; and ascertaining the temperature of the bulb on the basis of the quotient from the quotient, determined from the first spectral radiant power, and the quotient determined from the third spectral radiant power.

It is also advantageous here when the first, second, third and fourth spectral radiant power is a mean spectral radiant power.

As explained above, the determination of two coefficients eliminates the constant $\beta_0$, thus resulting in the following equation:

$$\frac{\beta_2}{\beta} = \frac{1 + \exp\left( \frac{T_C - R \cdot P_2 - T_2}{T_0} \right)}{1 + \exp\left( \frac{T_C - R \cdot P - T}{T_0} \right)} \quad (3)$$

$T_C$, R and $T_0$ designating lamp-specific constants, P the electric power at the temperature (T) to be ascertained, $P_2$ the electric power at the second temperature ($T_2$) and $\beta$ or $\beta_0$ the quotient of the radiant powers. Starting from this equation, two variants of the temperature determination are yielded, which are explained in more detail in the exemplary embodiments.

An apparatus according to the invention is set up to carry out one of the methods presented above, in order to carry out the determination and/or the control of the bulb temperature. For this purpose, the apparatus can comprise one or more programmable or hard-wired computers, microcontrollers or the like.

BEST MODE FOR CARRYING OUT THE INVENTION

The temperature of a high-pressure Hg discharge lamp is to be determined by way of example in a projector. The lamp bulb is arranged in a lamp housing that for its part is contained in the projector. The useful light of the lamp is emitted from the projector in a way known per se by means of reflector, light mixing rod and projector optics.

According to a first design of the present invention, mean first and second spectral radiant powers $M_P$ and $M_C$ are ascertained at a first wavelength $\lambda_P$ of 578 nm and a second wavelength $\lambda_C$ of 480 nm. By way of example, the useful light, the scattered light from the light mixing rod or the residual light penetrating through the reflector are measured for this purpose by a spectrometer. Likewise, this light can be filtered by appropriate bandpass filters such that still only light in the range of the said wavelengths passes through. It is then possible to use a simple sensor to detect the radiant power at the respective wavelength.

In accordance with the first design of the present invention, the constants $\beta_0$, $T_C$, R and $T_0$ are determined from a number of measurements of the actual bulb temperature—for example by means of pyrometers—and electric power, as well as by ascertaining the associated radiant powers at different temperatures. It is subsequently possible—with an unchanged measurement setup and thus unchanged constants—to determine the respective temperature of the lamp by ascertaining the quotient of first and second radiant powers.

However, since the constant $\beta_0$ depends on the spectral properties of the measuring path, such a determination of the constants would be necessary for each new arrangement of the spectrometer.

Consequently, in accordance with a second design of the present invention the quotient is determined at two different temperatures of the lamp, and the lamp temperature is ascertained therefrom. The influence of the measuring path is eliminated by ascertaining the quotients twice.

The electrical power $P=P_2$ is kept constant for this purpose in two measurements. Without cooling, the temperature $T_2$ is substantially the same for lamps of this type and can be ascertained in advance, for example by means of pyrometers.

Given subsequent cooling, the temperature T can therefore be determined from equation (3), that is to say independently of the factor $\beta_0$ in equation (2), and therefore independently of the measuring path, as long as the measurement of all four radiant powers is performed under the same conditions.

However, this requires knowledge of the second temperature $T_2$. Since, as in the second design, it is disadvantageous under some circumstances to operate the lamp initially without a cooling regime in order to set a second temperature $T_2$ known per se and to ascertain the associated quotient, in accordance with a third design of the present invention use is made of the following formula which the applicant has ascertained by extensive investigations:

$$(T_2 - T) \approx (P_2 - P)\frac{R_C}{1 + 4cR_C \cdot T^3} \quad (4)$$

$R_c$ and c being parameters specific to a lamp type.

In accordance with the third design of the present invention, the respective spectral radiant powers $M_P(P)$, $M_P(P_2)$, $M_C(P)$ and $M_C(P_2)$ are therefore ascertained, for example with the lamp under constant cooling, at two different electric powers P and $P_2$ at the first and second wavelengths $\lambda_P$, $\lambda_C$. These are used to determine the associated quotients $\beta = M_P(P)/M_C(P)$ and $\beta_2 = M_P(P_2)/M_C(P_2)$ of the radiant powers at the first and second wavelengths. The temperatures T and $T_2$ can be determined—advantageously numerically— from the system of equations (3) and (4) given above with the aid of the values thus found for P, P2, β and $β_2$ as well as the constants c, $R_C$, $T_C$, R and $T_0$ that are to be ascertained in advance.

By contrast with the second design, there is thus no need for any known second temperature as reference value. Nevertheless, the determination is independent of the constants $β_0$, that is to say the measuring path. All that is required is to measure all four spectral radiant powers under the same conditions.

In summary, the present invention utilizes the finding that the ratio, that is to say the quotient of the spectral radiant powers varies between principal lines and background as a function of the temperature of the lamp bulb, that is to say the radiant power in the range of the principal line (for example the Hg line for high-pressure Hg discharge lamps) becomes smaller, and that of the continuum becomes larger. This ratio obeys a relationship found by the applicant (equation (3)) and can be used for the purpose of determining the temperature of the bulb by measuring the radiant powers.

In order to be independent of the spectral properties of the measuring path, the ratio is determined at two different temperatures in advantageous designs of the present invention. If one of the temperatures is known as reference value, the other temperature can be determined from the ratio of the two quotients. If none of the two temperatures is known, a relationship (equation (4)) found empirically between the two temperatures and the associated electric powers can be utilized in order to determine the two temperatures from the corresponding system of equations.

What is claimed is:

1. A method for determining the bulb temperature (T) of high pressure discharge lamps that comprises the following steps:
   a) ascertaining a first spectral radiant power ($M_P$) at a first wavelength ($λ_P$);
   b) ascertaining a second spectral radiant power ($M_C$) at a second wavelength ($λ_C$) different from the first;
   c) determining a quotient (β) from the first and second radiant power; and
   d) determining the temperature (T) of the bulb on the basis of this quotient in that the temperature (T) of the bulb is determined from the following equation:

$$β(T) = β_0 \left[ 1 + \exp\left(\frac{T_C - R \cdot P - T}{T_0}\right) \right]$$

$β_0$, $T_C$, R and $T_0$ designating lamp-specific constants, P the electric power, T the lamp temperature and β the quotient ($M_P/M_C$) of the first and second radiant power.

2. A method for controlling the bulb temperature (T) of high pressure discharge lamps that comprises the following steps:
   prescribing a desired bulb temperature ($T_{Soll}$);
   determining the actual bulb temperature (T) by means of a method for determining the bulb temperature (T) of high pressure discharge lamps that including the following steps:
   a) ascertaining a first spectral radiant power ($M_P$) at a first wavelength ($λ_P$);
   b) ascertaining a second spectral radiant power ($M_C$) at a second wavelength ($λ_C$) different from the first;
   c) determining the a quotient (β) from the first and second radiant power; and
   d) determining the temperature (T) of the bulb on the basis of this quotient; and
   controlling at least one operational parameter of the high pressure discharge lamp such that the actual bulb temperature approaches the desired bulb temperature.

3. An apparatus for determining the bulb temperature (T), of high pressure discharge lamps that comprises:
   a measuring device for ascertaining a first spectral radiant power ($M_P$) at a first wavelength ($λ_P$) and for ascertaining a second spectral radiant power ($M_C$) at a second wavelength ($λ_C$) different from the first;
   a processing device for determining a quotient (β) from the first and second radiant power; and
   a computing device for determining the temperature (T) of the bulb on the basis of this quotient,
   in that the measuring device is also set up for ascertaining a third spectral radiant power ($M_{P,\,2}$) at the first wavelength ($λ_P$) and a second temperature ($T_2$), different from that at which the first spectral radiant power is ascertained, and for ascertaining a fourth spectral radiant power ($M_{C,\,2}$) at the second wavelength ($λ_C$) and the second temperature ($T_2$); in that the processing device is also set up for determining a quotient ($β_2$) from the third and fourth radiant power; and in that the computing device carries out the determination of the temperature (T) of the bulb on the basis of a quotient ($β/β_2$) of the quotient (β) ascertained from the first spectral radiant power, and the quotient ($β_2$) ascertained from the third spectral radiant power.

4. A controller for the bulb temperature (T) of high pressure discharge lamps that comprises:
   a) an input device for prescribing a desired bulb temperature ($T_{Soll}$);
   b) an apparatus for determining the actual bulb temperature (T) of high pressure discharge lamps that including:
      a measuring device for ascertaining a first spectral radiant power ($M_P$) at a first wavelength ($λ_P$) and for ascertaining a second spectral radiant power ($M_C$) at a second wavelength ($λ_C$) different from the first;
      a processing device for determining a quotient (β) from the first and second radiant power; and
      a computing device for determining the temperature (T) of the bulb on the basis of this quotient; and
   c) a control device for controlling at least one operational parameter of the high pressure discharge lamp such that the actual bulb temperature approaches the desired bulb temperature.

5. A method for determining the bulb temperature (T) of high pressure discharge lamps that comprises the following steps:
   a) ascertaining a first spectral radiant power ($M_P$) at a first wavelength ($λ_P$);
   b) ascertaining a second spectral radiant power ($M_C$) at a second wavelength ($λ_C$) different from the first;
   c) determining a quotient (β) from the first and second radiant power; and
   d) determining the temperature (T) of the bulb on the basis of this quotient
   e) ascertaining a third spectral radiant power ($M_P$, 2) at the first wavelength ($λ_P$) and a second temperature ($T_2$), differing from that at which the first spectral radiant power is ascertained;
   f) ascertaining a fourth spectral radiant power ($M_C$, 2) at the second wavelength ($λ_C$) and the second temperature ($T_2$);

g) determining a quotient ($\beta_2$) of the third and fourth radiant power; and h) determining the temperature (T) of the bulb on the basis of the quotient ($\beta/\beta_2$) from the quotient ($\beta$), ascertained from the first spectral radiant power, and the quotient ($\beta_2$) ascertained from the third spectral radiant power.

6. The method as claimed in claim 5, in that the first, second, third and fourth spectral radiant power is a mean spectral radiant power.

7. The method as claimed in claim 5, in that the temperature (T) of the bulb is determined from the following equation:

$$\frac{\beta_2}{\beta} = \frac{1 + \exp\left(\frac{T_C - R \cdot P_2 - T_2}{T_0}\right)}{1 + \exp\left(\frac{T_C - R \cdot P - T}{T_0}\right)}$$

$T_C$, R and $T_0$ designating lamp-specific constants, P the electric power at the temperature (T) to be ascertained, and $P_2$ the electric power at the second temperature ($T_2$).

8. An apparatus for determining the bulb temperature (T), of high pressure discharge lamps that comprises:

a measuring device for ascertaining a first spectral radiant power ($M_P$) at a first wavelength ($\lambda_P$) and for ascertaining a second spectral radiant power ($M_C$) at a second wavelength ($\lambda_P$) different from the first;

a processing device for determining a quotient ($\beta$) from the first and second radiant power; and a computing device for determining the temperature (T) of the bulb on the basis of this quotient; in that the measuring device is also set up for ascertaining a third spectral radiant power ($M_{P, 2}$) at the first wavelength ($\lambda_P$) and a second temperature ($T_2$), different from that at which the first spectral radiant power is ascertained, and for ascertaining a fourth spectral radiant power ($M_{C, 2}$) at the second wavelength ($\lambda_C$) and the second temperature ($T_2$); in that the processing device is also set up for determining a quotient ($\beta_2$) from the third and fourth radiant power; and in that the computing device carries out the determination of the temperature(T) of the bulb on the basis of the quotient ($\beta/\beta_2$) of the quotient ($\beta$) ascertained from the first spectral radiant power, and the quotient ($\beta_2$) ascertained from the third radiant power;

in that the measuring, processing, and/or computing device is set up such that it operates using a method as claimed in claim 5.

* * * * *